US006773032B2

(12) United States Patent
Redman et al.

(10) Patent No.: US 6,773,032 B2
(45) Date of Patent: Aug. 10, 2004

(54) AMBULATORY APPARATUS

(76) Inventors: Don L. Redman, 7002 Calle Morera, Tucson, AZ (US) 85750; Samuel G. Redman, 4790 N. Keetseel Trail, Tucson, AZ (US) 85749; Greggory Schickling, 4509 E. 13th St., Tucson, AZ (US) 85711

( * ) Notice: Subject to any disclaimer, the term of this patent is extended or adjusted under 35 U.S.C. 154(b) by 0 days.

(21) Appl. No.: 10/160,713

(22) Filed: May 31, 2002

(65) Prior Publication Data

US 2003/0227161 A1 Dec. 11, 2003

(Under 37 CFR 1.47)

Related U.S. Application Data

(60) Provisional application No. 60/132,830, filed on May 6, 1999.

(51) Int. Cl.7 .................................................. B60S 9/00

(52) U.S. Cl. ..................... 280/755; 280/758; 280/304.1

(58) Field of Search ................................. 280/755, 757, 280/758, 304.1, 293; 297/330, 354.13, DIG. 4, DIG. 10

(56) References Cited

U.S. PATENT DOCUMENTS 5,172,925 A * 12/1992 Kendrick et al. ........ 280/250.1
6,565,112 B2 * 5/2003 Hanson et al. .............. 280/650
6,588,792 B1 * 7/2003 Koerlin et al. .............. 280/650

* cited by examiner

*Primary Examiner*—Paul N. Dickson
*Assistant Examiner*—Faye M. Fleming
(74) *Attorney, Agent, or Firm*—Parsons & Goltry; Michael W. Goltry; Robert A. Parsons

(57) ABSTRACT

Ambulatory apparatus includes a framework mounted to a chassis for movement between sitting, standing and reclining conditions. Leading, trailing and intermediate wheel assemblies are attached to the chassis for supporting the chassis in a first wheeled condition including the leading and intermediate wheel assemblies engaged for wheeled movement against a support surface and a second wheeled condition including the trailing and intermediate wheel assemblies engaged for wheeled movement against a support surface. The chassis and the framework define a center of gravity that is centered at the intermediate wheel assembly in each of the sitting and reclining conditions of the framework, and that is centered at the leading wheel assembly in the standing condition of the framework. An attached movable ballast is also provided, which is disposed in relation to the framework causing the defined center of gravity at the intermediate wheel assembly in each of the sitting and reclining conditions of the framework, and that adjusts so as to be disposed in relation to the framework causing the defined center of gravity at the leading wheel assembly in the standing condition of the framework.

14 Claims, 4 Drawing Sheets

AMBULATORY APPARATUS

CROSS-REFERENCE TO RELATED APPLICATIONS

This application claims the benefit of application Ser. No. 09/566,062, filed May 5, 2000, which claims the benefit of U.S. Provisional Patent Application Serial No. 60/132,830, filed May 6, 1999.

FIELD OF THE INVENTION

This invention concerns ambulatory apparatus for aiding physically challenged individuals in moving about and for assuming sitting, reclining and standing positions.

BACKGROUND OF THE INVENTION

The prior art is replete with ambulatory apparatus of the type for supporting and assisting physically challenged users in moving about, walking, exercise or otherwise going on foot. Many such prior art ambulatory apparatus can be found not only in private residences for permitting physically challenged users to move about in their homes, but also in elderly care and physical therapy facilities. Although exemplary, known ambulatory apparatus are difficult to construct, uncomfortable and prove particularly challenging and dangerous for physically challenged users to use independently. Given these and other deficiencies in the art, the continued need for certain new and useful improvements is evident.

SUMMARY OF THE INVENTION

The above problems and others are at least partially solved and the above purposes and others realized in new and improved ambulatory apparatus for aiding physically challenged users in moving about and for assuming sitting, reclining and standing positions. An exemplary ambulatory apparatus embodiment consists of a framework mounted to a chassis for movement between sitting, standing and reclining conditions. Leading, trailing and intermediate wheel assemblies are attached to the chassis and support the chassis in first and second wheeled conditions. The first wheeled condition is the leading and intermediate wheel assemblies engaged for wheeled movement against a support surface, and the second wheeled condition is the trailing and intermediate wheel assemblies engaged for wheeled movement against a support surface. The chassis and the framework define a center of gravity that is centered at the intermediate wheel assembly in each of the sitting and reclining conditions of the framework, and that is centered at the leading wheel assembly in the standing condition of the framework. The framework and the chassis adjust between the sitting, standing and reclining conditions of the framework causing the defined center of gravity at the intermediate wheel assembly in each of the sitting and reclining conditions of the framework, and at the leading wheel assembly in the standing condition of the framework. The framework includes a backrest, a seat and a legrest. Preferably, at least one of the backrest, the seat and the legrest is mounted for reciprocal movement for permitting at least one of the backrest, the seat and the legrest to move reciprocally with the operator in response to movement of the framework between the sitting, standing and reclining conditions. In a particular embodiment, the legrest is movable between lowered and raised positions and between shortened and lengthened conditions in response to movement of the legrest between the lowered and raised positions.

The immediate ambulatory apparatus embodiment incorporates controls and a drive assembly for driving one of the leading, trailing and intermediate wheel assemblies in response to actuation of the controls. The chassis is furnished with a movable ballast, that is disposed in relation to the framework causing the defined center of gravity at the intermediate wheel assembly in each of the sitting and reclining conditions of the framework, and that adjusts so as to be disposed in relation to the framework causing the defined center of gravity at the leading wheel assembly in the standing condition of the framework.

Another ambulatory apparatus embodiment of the invention includes a body-supporting framework that is supported by a chassis for movement between first, second and third conditions for supporting and moving an operator between sitting, standing and reclining positions, respectively. The framework has a backrest, a seat, a legrest mounted for pivotal movement between lowered and raised positions, and a footrest portion mounted to the legrest for reciprocal movement between retracted and extended conditions. The footrest portion is reciprocally moveable between the retracted and extended conditions in response to pivotal movement of the legrest between the lowered and raised positions. Leading, trailing and intermediate wheel assemblies are attached to the chassis and support the chassis in a first wheeled condition, which is composed of the leading and intermediate wheel assemblies engaged for wheeled movement against a support surface, and a second wheeled condition, which is composed of the trailing and intermediate wheel assemblies engaged for wheeled movement against a support surface. The chassis and the framework define a center of gravity that is centered at the intermediate wheel assembly in each of the first and third conditions of the framework, and that is centered at the leading wheel assembly in the second condition of the framework. The framework and the chassis adjust between the first, second and third conditions of the framework causing the defined center of gravity at the intermediate wheel assembly in each of the first and third conditions of the framework, and at the leading wheel assembly in the second condition of the framework. The immediate ambulatory apparatus embodiment incorporates controls and a drive assembly for driving one of the leading, trailing and intermediate wheel assemblies in response to actuation of the controls. Preferably, at least one of the backrest and the seat is mounted for reciprocal movement. The chassis is furnished with a movable ballast, that is disposed in relation to the framework causing the defined center of gravity at the intermediate wheel assembly in each of the first and third conditions of the framework, and that adjusts so as to be disposed in relation to the framework causing the defined center of gravity at the leading wheel assembly in the second condition of the framework.

BRIEF DESCRIPTION OF THE DRAWINGS

The foregoing and further and more specific objects and advantages of the invention will become readily apparent to those skilled in the art from the following detailed description thereof taken in conjunction with the drawings in which.

DETAILED DESCRIPTION OF PREFERRED EMBODIMENTS

The present invention provides, among other things, a new and improved ambulatory apparatus or wheelchair for accommodating and providing mobility for physically challenged or paralyzed individuals. The invention is easy to construct, comfortable, easy to use and is capable of supporting and moving an operator between sitting, reclining and standing positions.

Figure 1:
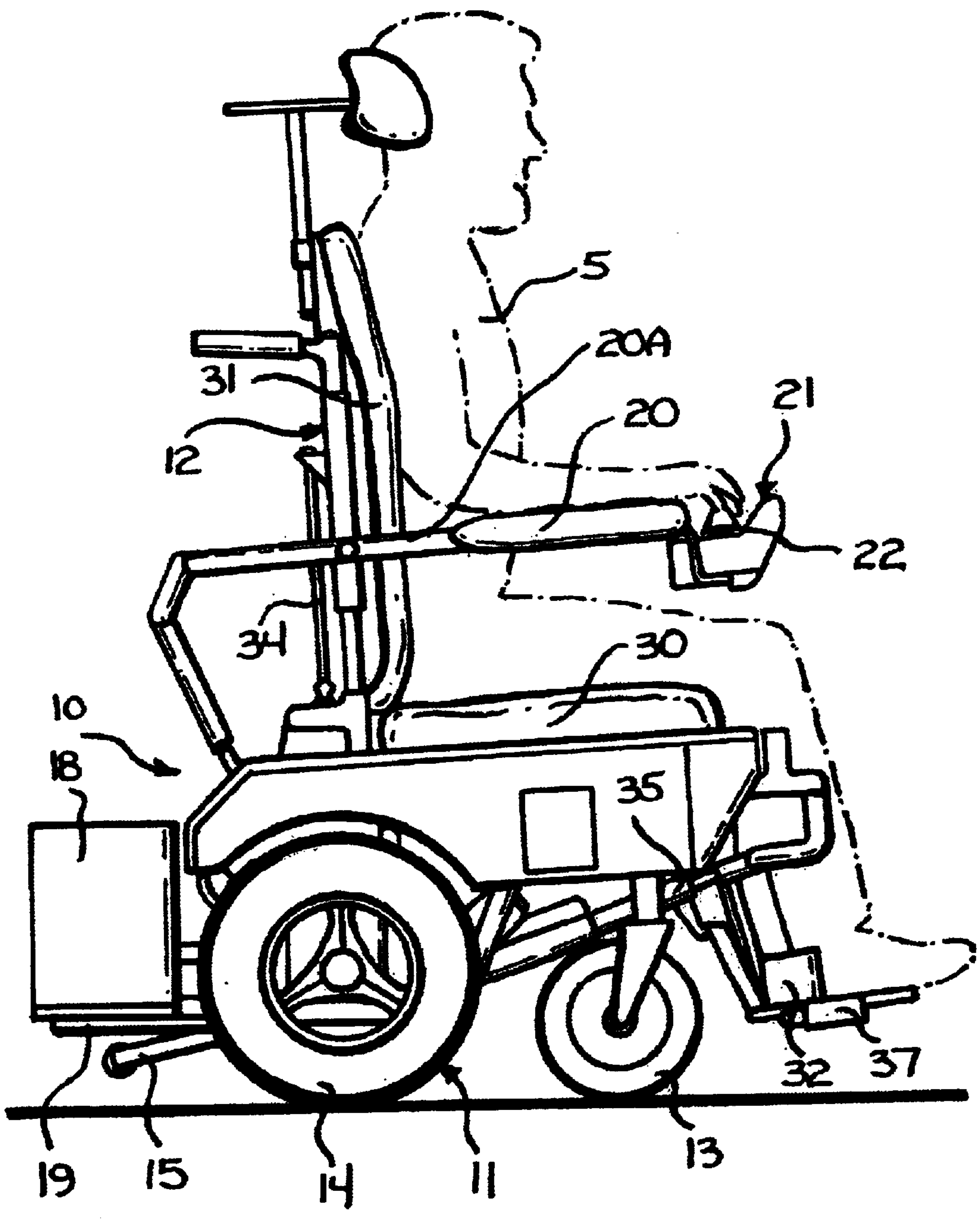
FIG. 1 is a side view of an ambulatory apparatus shown supporting an operator in a sitting position, the ambulatory apparatus constructed in accordance with the invention.
Figure 1A:
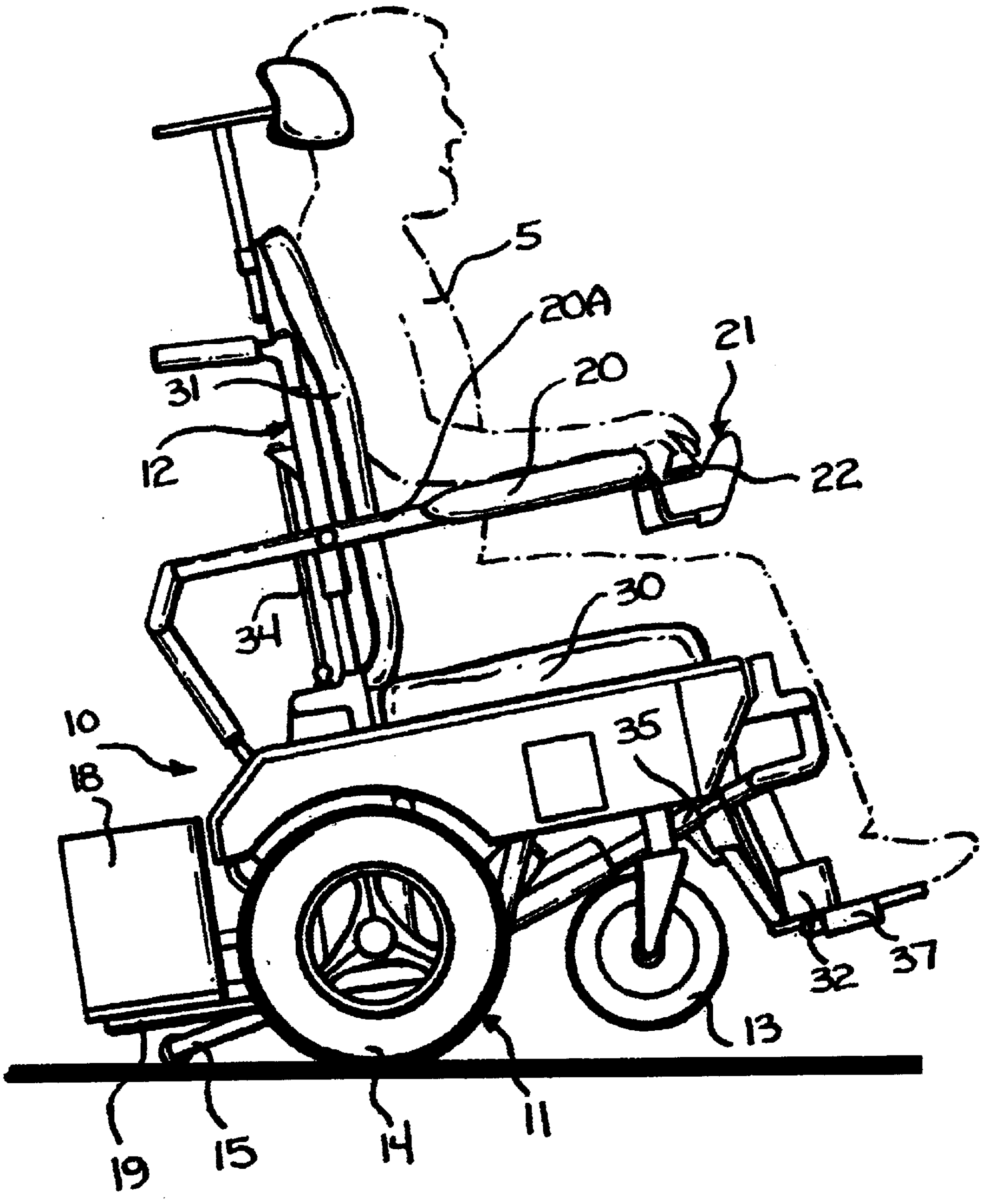
FIG. 1A is a view very similar to that of FIG. 1.

Turning now to the drawings, in which like reference characters indicate corresponding elements throughout the several views, FIGS. 1 and 1A are side views of an ambulatory apparatus or wheelchair 10 constructed in accordance with the invention. Wheelchair 10 includes a wheeled chassis 11 that supports a body-supporting framework 12. In FIG. 1, body-supporting framework 12 is shown as it would appear supporting an operator 5 in a sitting position. Wheeled chassis 11 includes a front/leading or driven wheel assembly 13, an intermediate or drive wheel assembly 14 and a rear or trailing wheel assembly 15. Assemblies 13 and 14 each include wheels supported by chassis 11 or by an axle fixed to chassis 11. Framework 12 is movable between sitting, standing and reclining conditions. Chassis 11 and framework 12 are constructed and arranged to define a center of gravity of wheelchair 10 at drive wheel assembly 14 in each of the sitting and standing conditions of the framework 12, and at driven wheel assembly 13 in the standing condition of framework 12. Wheeled chassis 11 supports conventional electric motors and actuators that drive the wheels of the drive wheel assembly 14. A battery 18 carried by an extension 19 of wheeled chassis 11 rearward of drive wheel assembly 14 provides the electric motors, actuators and other electrically powered features of the invention with electrical energy. To actuate the electric motors, an armrest 20 fastened to body-supporting framework 12 and wheeled chassis 11 supports controls 21 the operator 5 can access by hand. By controlled movement of controls 21, operator 5 is able to actuate the electric motors via one or more of the actuators for driving the wheels of drive wheel assembly 14 in forward and rearward directions. Joystick apparatus 22 constitutes controls 21 in this specific embodiment. Like conventional powered wheelchairs, the wheels of driven wheel assembly 13 swivel and the electric motors that drive the wheels of the drive wheel assembly can actuate independently of each other. As a result, through actuation of joystick apparatus 22, an operator 5 may drive and turn wheelchair 10 as desired. Because joystick apparatus 22 characterizes controls 21 in the present embodiment, the operator will, of course, need to enjoy at least limited hand and arm movement. For those having only limited head movement, such as quadriplegics, mouth or blow-operated controls/switches may be employed as part of controls 21 for not only driving wheelchair 10 but also controlling operation of body-supporting framework 12 in accordance with the invention.

Figure 2:
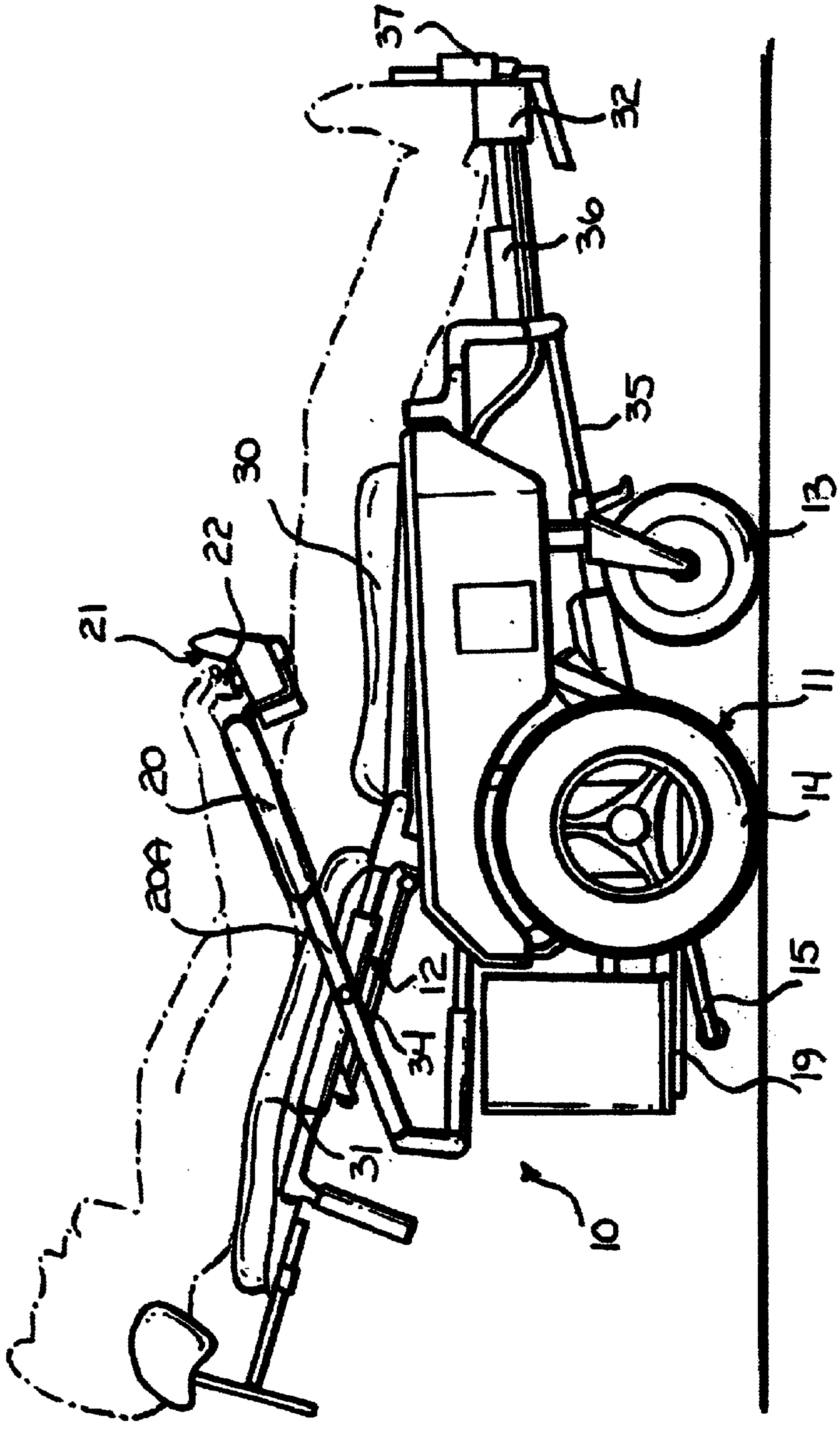
FIG. 2 is a side view of the ambulatory apparatus of FIG. 1 shown supporting an operator in a reclining position.
Figure 3:
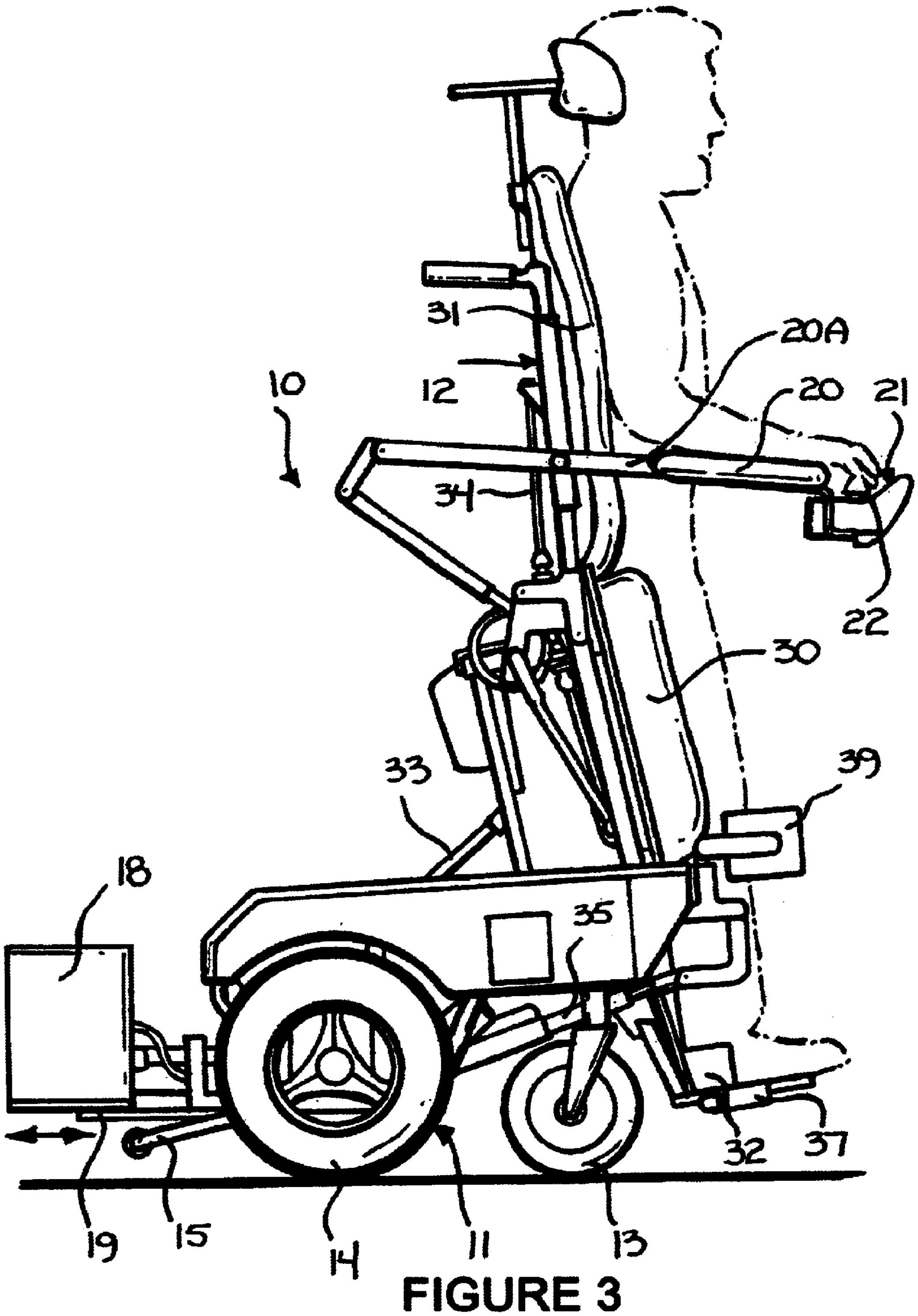
FIG. 3 is a side view of the ambulatory apparatus of FIG. 1 shown supporting an operator in a standing position.

Body-supporting framework 12 incorporates three main elements, namely, a seat 30, a backrest 31 and a leg rest 32. Seat 30, backrest 31 and leg rest 32 are coupled for pivotal movement. More particularly, framework 12 includes pivotally attached elements to which seat 30, backrest 32 and legrest 32 are attached or defined. As best shown in FIG. 3, wheeled chassis 11 and/or body-supporting framework 12 supports conventional worm, pneumatic or hydraulic cylinder assemblies 33, 34 and 35 and corresponding actuators. Controls 21 include buttons or switches an operator may actuate for actuating one or more of the cylinder assemblies 33, 34 and 35 via one or more of the actuators. Through selective actuation, framework 12 may be moved for moving seat 30, backrest 31 and leg rest 32 between a plurality of conditions for supporting an operator in a seating position (FIG. 1), a reclining position (FIG. 2) and a standing position (FIG. 3). A knee bolster 39 carried by framework 12 is normally employed for engaging and supporting the lower legs of the operator for movement into the standing position. Seat 30 and backrest 31 are each mounted to framework 12 for reciprocal movement along a linear path toward and away from one another so that they will move with the operator as needed during movement of body-supporting framework 12. This ensures that seat 30 and backrest 31 will not rub or pull against the operator when framework 12 moves the operator between the sitting, reclining and standing positions. Those skilled in the art will readily appreciate that rails and ways, ways and rollers, telescoping engagement structure, linkage assemblies and/or other conventional engagement or bearing structure may be employed for facilitating a reciprocally movable mount between seat 30 and backrest 31 and framework 12.

In the sitting and reclining positions, leg rest 32, in response to actuation of controls 21, is movable between a lowered position (FIG. 1) and a raised position (FIG. 2) for supporting the operator's legs in an extended condition. When moved from its lowered to its raised position, another worm, pneumatic or hydraulic cylinder assembly 36 also actuates, which extends the foot rest portion 37 of the leg rest 32 from a shortened condition to a lengthened condition for comfortably accommodating the length of the operator's legs. When moved from its raised position to its lowered position, assembly 36 also actuates, which retracts the foot rest portion 37 of the leg rest 32 from its lengthened condition to its shortened condition. Furthermore, when an operator actuates controls 21 to move body-supporting framework 12 into the standing position, extension 19, which is mounted to reciprocate along a substantially linear path, moves battery 18 outwardly away from drive wheels 14 for equalizing weight distribution across wheelchair 10. This ensures that in the standing position the operator is firmly supported against tipping over. Also, armrest 20 is supported by an armrest framework 20A that pivots and moves during movement of the body-supporting framework 12. Those skilled in the art will readily appreciate that telescoping engagement structure, linkage assemblies or other suitable structure may be employed for facilitating the reciprocal movement and adjustment of legrest 32 and extension 19.

Controls 21 allow the operator to operate wheelchair 10 in the sitting, reclining and standing positions through a programmable electronic controller system. Chassis 11 and framework 12 are constructed and arranged so that the weight of the operator is centered over drive wheel assembly 14 in the sitting and reclining positions of framework 12, and over the driven wheel assembly 13 in the standing position of framework. Also, the trailing wheel assembly 15 is normally positioned above the ground in the sitting and standing positions. However, by adjusting his or her weight rearward in the sitting position or by adjusting the backrest 31 at least partially in the reclining position, the driven wheel assembly 13 rises above the ground in a floating condition and the trailing wheel assembly 15 and the drive wheel assembly 14 bear the operator weight as shown in FIG. 1A. As a result, the operator may easily move driven wheel assembly 13 over irregular surfaces as needed. Trailing wheel assembly 15 and drive wheel assembly 14 are preferably spring-loaded or otherwise include mechanical shock absorbing structure for providing smooth comfortable movement of wheelchair 10 over the ground.

In accordance with the invention, therefore, it is to be understood that chassis 11 and framework 12 define a center of gravity that is centered at drive wheel assembly 14 in each of the sitting and reclining conditions of framework 12, and that is centered at driven wheel assembly 13 in the standing condition of framework 12. This is caused by the adjustment of, and the cooperation between, framework 12 and chassis 11 in the movement of framework 12 between the sitting, standing and reclining conditions of framework 12 causing the defined center of gravity at drive wheel assembly 14 in each of the sitting and reclining conditions of framework 12, and at driven wheel assembly 13 in the standing condition of framework 12. As previously explained, when an operator actuates controls 21 to move body-supporting framework 12 into the standing position, extension 19, which is mounted to reciprocate along a substantially linear path, moves battery 18 outwardly away from drive wheels 14 for equalizing weight distribution across wheelchair 10. Extension 19 and battery 18 together function as a ballast of chassis 11, that is disposed in relation to framework 12 causing the defined center of gravity at drive wheel assembly 14 in each of the sitting and reclining conditions of framework 12, and that adjusts so as to be disposed in relation to framework 12 causing the defined center of gravity at driven wheel assembly 13 in the standing condition of framework 12.

The present invention is described above with reference to a preferred embodiment. However, those skilled in the art will recognize that changes and modifications may be made in the described embodiment without departing from the nature and scope of the present invention. Various changes and modifications to the embodiment herein chosen for purposes of illustration will readily occur to those skilled in the art. To the extent that such modifications and variations do not depart from the spirit of the invention, they are intended to be included within the scope thereof, which is assessed only by a fair interpretation of the following claims.

Having fully described the invention in such clear and concise terms as to enable those skilled in the art to understand and practice the same, the invention claimed is:

What is claimed is:

1. Ambulatory apparatus comprising:

a framework mounted to a chassis for movement between sitting, standing and reclining conditions;

leading, trailing and intermediate wheel assemblies attached to the chassis for supporting the chassis in a first wheeled condition comprising the leading and intermediate wheel assemblies engaged for wheeled movement against a support surface and a second wheeled condition comprising the trailing and intermediate wheel assemblies engaged for wheeled movement against a support surface;

the chassis and the framework defining a center of gravity that is centered at the intermediate wheel assembly in each of the sitting and reclining conditions of the framework, and that is centered at the leading wheel assembly in the standing condition of the framework; and an attached movable ballast that is disposed in relation to the framework causing the defined center of gravity at the intermediate wheel assembly in each of the sitting and reclining conditions of the framework, and that adjusts so as to be disposed in relation to the framework causing the defined center of gravity at the leading wheel assembly in the standing condition of the framework.

2. Ambulatory apparatus of claim 1, wherein the framework includes a backrest, a seat and a legrest.

3. Ambulatory apparatus of claim 2, wherein the legrest is movable between lowered and raised positions and between shortened and lengthened conditions in response to movement of the legrest between the lowered and raised positions.

4. Ambulatory apparatus of claim 1, further including controls and a drive assembly for driving one of the leading, trailing and intermediate wheel assemblies in response to actuation of the controls.

5. Ambulatory apparatus comprising:

a framework mounted to a chassis for movement between first, second and third conditions for supporting and moving an operator between sitting, standing and reclining positions, respectively, the framework having a backrest, a seat and a legrest;

leading, trailing and intermediate wheel assemblies attached to the chassis for supporting the chassis in a first wheeled condition comprising the leading and intermediate wheel assemblies engaged for wheeled movement against a support surface and a second wheeled condition comprising the trailing and intermediate wheel assemblies engaged for wheeled movement against a support surface;

the chassis and the framework defining a center of gravity that is centered at the intermediate wheel assembly in each of the first and third conditions of the framework, and that is centered at the leading wheel assembly in the second condition of the framework;

at least one of the backrest, the seat and the legrest mounted for reciprocal movement for permitting at least one of the backrest, the seat and the legrest to move reciprocally with the operator in response to movement of the framework between the first, second and third conditions; and an attached movable ballast that is disposed in relation to the framework causing the defined center of gravity at the intermediate wheel assembly in each of the first and third conditions of the framework, and that adjusts so as to be disposed in relation to the framework causing the defined center of gravity at the leading wheel assembly in the second condition of the framework.

6. Ambulatory apparatus of claim 5, further including controls and a drive assembly for driving one of the leading, trailing and intermediate wheel assemblies in response to actuation of the controls.

7. Ambulatory apparatus of claim 5, wherein the legrest is movable between lowered and raised positions and between shortened and lengthened conditions in response to movement of the legrest between the lowered and raised positions.

8. Ambulatory apparatus comprising:

a body-supporting framework supported by a chassis for movement between first, second and third conditions for supporting and moving an operator between sitting, standing and reclining positions, respectively, the framework having a backrest, a seat, a legrest mounted for pivotal movement between lowered and raised positions, and a footrest portion mounted to the legrest for reciprocal movement between retracted and extended conditions;

the footrest portion reciprocally moveable between the retracted and extended conditions in response to pivotal movement of the legrest between the lowered and raised positions;

leading, trailing and intermediate wheel assemblies attached to the chassis for supporting the chassis in a first wheeled condition comprising the leading and intermediate wheel assemblies engaged for wheeled movement against a support surface and a second wheeled condition comprising the trailing and intermediate wheel assemblies engaged for wheeled movement against a support surface;

the chassis and the framework defining a center of gravity that is centered at the intermediate wheel assembly in each of the first and third conditions of the framework, and that is centered at the leading wheel assembly in the second condition of the framework; and an attached movable ballast that is disposed in relation to the framework causing the defined center of gravity at the intermediate wheel assembly in each of the first and third conditions of the framework, and that adjusts so as to be disposed in relation to the framework causing the defined center of gravity at the leading wheel assembly in the second condition of the framework.

9. Ambulatory apparatus of claim 8, further including controls and a drive assembly for driving one of the leading, trailing and intermediate wheel assemblies in response to actuation of the controls.

10. Ambulatory apparatus of claim 9, wherein at least one of the backrest and the seat is mounted for reciprocal movement.

11. Ambulatory apparatus comprising:

a chassis supporting a framework that is movable between sitting, standing and reclining conditions, the framework including at least one reciprocally movable body-supporting element;

leading, trailing and intermediate wheel assemblies attached to the chassis for supporting the chassis in a first wheeled condition comprising the leading and intermediate wheel assemblies engaged for wheeled movement against a support surface and a second wheeled condition comprising the trailing and intermediate wheel assemblies engaged for wheeled movement against a support surface;

the chassis and the framework defining a center of gravity that is centered at the intermediate wheel assembly in each of the sitting and reclining conditions of the framework, and that is centered at the leading wheel assembly in the standing condition of the framework; and an attached movable ballast that is disposed in relation to the framework causing the defined center of gravity at the intermediate wheel assembly in each of the sitting and reclining conditions of the framework, and that adjusts so as to be disposed in relation to the framework causing the defined center of gravity at the leading wheel assembly in the standing condition of the framework.

12. Ambulatory apparatus of claim 11, further including controls and a drive assembly for driving one of the leading, trailing and intermediate wheel assemblies in response to actuation of the controls.

13. Ambulatory apparatus of claim 11, wherein the at least one body-supporting element of the framework comprises one of a backrest, a legrest and a seat.

14. Ambulatory apparatus of claim 11, wherein the framework includes a legrest that is movable between lowered and raised positions and between shortened and lengthened conditions in response to movement of the legrest between the lowered and raised positions.

* * * * *